United States Patent
Santillan Gutierrez et al.

(10) Patent No.: US 10,363,841 B1
(45) Date of Patent: Jul. 30, 2019

(54) VEHICLE SEAT ADJUSTMENT ASSEMBLY

(71) Applicant: Ford Global Technologies, LLC, Dearborn, MI (US)

(72) Inventors: Diego Santillan Gutierrez, Hidalgo (MX); Alejandro Rosas Vazquez, Mexico City (MX); Fernando Paisano Rodriguez, Puebla (MX)

(73) Assignee: Ford Global Technologies, LLC, Dearborn, MI (US)

( * ) Notice: Subject to any disclaimer, the term of this patent is extended or adjusted under 35 U.S.C. 154(b) by 89 days.

(21) Appl. No.: 15/871,580

(22) Filed: Jan. 15, 2018

(51) Int. Cl.
   *B60N 2/68* (2006.01)
   *B60N 2/23* (2006.01)
   *B60N 2/02* (2006.01)
   *B60N 2/06* (2006.01)
   *B60N 2/12* (2006.01)

(52) U.S. Cl.
   CPC ............. *B60N 2/23* (2013.01); *B60N 2/0228* (2013.01); *B60N 2/067* (2013.01); *B60N 2/12* (2013.01); *B60N 2002/0236* (2013.01)

(58) Field of Classification Search
   CPC ... B60N 2/22; B60N 2/68; B60N 2/12; B60N 2/20; B60N 2/2821; B60N 2/06; B60N 2/3013; B60N 2/682; B60N 2/2356
   See application file for complete search history.

(56) References Cited

U.S. PATENT DOCUMENTS

| | | | |
|---|---|---|---|
| 5,292,178 A * | 3/1994 | Loose ................. | B60N 2/0232 297/337 |
| 5,348,373 A | 9/1994 | Stiennon | |
| 6,216,995 B1 | 4/2001 | Koester | |
| 7,320,501 B2 | 1/2008 | Keyser et al. | |
| 8,096,616 B2 * | 1/2012 | Ventura ................. | B60N 2/206 296/65.09 |
| 9,233,627 B2 | 1/2016 | Michalak et al. | |
| 9,604,553 B2 * | 3/2017 | Jaranson ................. | B60N 2/22 |
| 2011/0006580 A1 * | 1/2011 | Ishimoto ................. | B60N 2/68 297/452.18 |
| 2011/0043024 A1 * | 2/2011 | Kokubo ............... | B60N 2/0232 297/378.1 |
| 2011/0193391 A1 * | 8/2011 | Mitsuhashi .......... | B60N 2/2252 297/354.1 |
| 2011/0241401 A1 * | 10/2011 | Otsuka ................. | B60N 2/0715 297/331 |
| 2012/0261963 A1 * | 10/2012 | Heyer ................... | B60N 2/0232 297/313 |
| 2012/0280548 A1 * | 11/2012 | Nock ....................... | B60N 2/20 297/354.1 |
| 2013/0193735 A1 * | 8/2013 | Bonk ................... | B60N 2/0232 297/378.12 |
| 2014/0110986 A1 * | 4/2014 | Yamaguchi .............. | B60N 2/68 297/378.1 |
| 2014/0159457 A1 * | 6/2014 | Jaranson ................. | B60N 2/22 297/362 |

(Continued)

*Primary Examiner* — Shin H Kim
(74) *Attorney, Agent, or Firm* — Vichit Chea; Price Heneveld LLP

(57) ABSTRACT

A vehicle seat is provided herein. The vehicle seat includes a seatback pivotally coupled to a seat bottom. An adjustment assembly is operably coupled with the seat and includes a linear actuator. The linear actuator is configured to release a recliner mechanism when moved in a first direction and is configured to release a track assembly when moved in a second direction.

20 Claims, 13 Drawing Sheets

(56) References Cited

U.S. PATENT DOCUMENTS

2015/0258955 A1* 9/2015 Jayasuriya ............ B60R 22/023
297/353
2016/0016488 A1* 1/2016 Farooq .................... B60N 2/20
297/354.12

* cited by examiner

VEHICLE SEAT ADJUSTMENT ASSEMBLY

FIELD OF THE INVENTION

The present disclosure generally relates to a vehicle seat, and more specifically, a vehicle seat having an adjustment assembly for adjusting the seatback and/or seat bottom.

BACKGROUND OF THE INVENTION

Vehicle seats generally include a recliner mechanism for selective adjustment of the angular position of a seatback relative to a seat bottom, allowing a user to recline or incline the seatback. Manually operated recliner mechanisms generally have a locked position, in which the seatback cannot pivot, and an unlocked position, in which the seatback can be pivoted. A user manually releases the recliner mechanism to unlock it, allowing adjustment of the seatback position. Releasing the lever relocks the recliner mechanism, thus retaining the seatback in the adjusted position. The vehicle seat may also be movably coupled to a vehicle floor for adjusting the seat in a fore/aft position.

SUMMARY OF THE INVENTION

According to one aspect of the present disclosure, a vehicle seat is provided herein. The vehicle seat includes a seatback pivotally coupled to a seat bottom. An adjustment assembly is operably coupled with the seat and includes a linear actuator. The linear actuator is configured to release a recliner mechanism when moved in a first direction and configured to release a track assembly when moved in a second direction.

According to another aspect of the present disclosure, a vehicle seat is provided herein. The vehicle seat includes a seatback pivotally coupled to a seat bottom. An adjustment assembly is operably coupled with the seat and is configured to pull a recliner arm when moved in a first direction and a track assembly arm when moved in a second direction. A wire is operably coupled with the recliner arm and a recliner mechanism to release the seatback relative the seat bottom. A disengagement rod operably coupled with the track assembly arm.

According to yet another aspect of the present disclosure, a vehicle seat is provided herein. The vehicle seat includes a seatback pivotally coupled to a seat bottom. An adjustment assembly includes a rack and a pinion configured to release a first feature and a second feature when the rack is moved in first and second directions. The rack defines a pinion cavity and first and second guides. The first guide is disposed on an opposing side of the pinion cavity from the second guide.

These and other aspects, objects, and features of the present invention will be understood and appreciated by those skilled in the art upon studying the following specification, claims, and appended drawings.

DETAILED DESCRIPTION OF THE PREFERRED EXAMPLES

Figure 1:
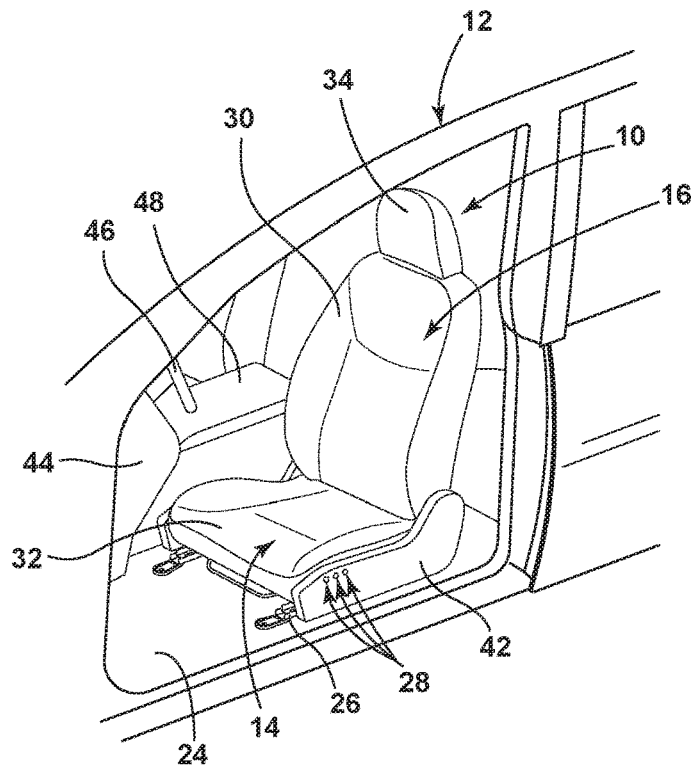
FIG. 1 is a side perspective view of a seat for a vehicle incorporating an adjustment assembly, according to some examples.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary examples of the inventive concepts defined in the appended claims. Hence, specific dimensions and other physical characteristics relating to the examples disclosed herein are not to be considered as limiting, unless the claims expressly state otherwise.

As required, detailed examples of the present invention are disclosed herein. However, it is to be understood that the disclosed examples are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a vehicle seat employing an adjustment assembly. The vehicle seat includes a seatback pivotably coupled to a seat bottom. The seat may be operably coupled with a track assembly. The adjustment assembly is operably coupled with one or more switches for controlling the adjustment assembly. In some examples, the adjustment assembly may include a rack and pinion assembly. When the pinion is rotated in a first direction, a recliner mechanism may be released and the seatback can be adjusted relative to the seat bottom. When the pinion is rotated in a second, opposing direction, the seat may be released from the track assembly and slid therealong. Accordingly, in some examples, a single motor may be capable of controlling multiple features of the seat.

Referring to FIGS. 1-16, the reference numeral 10 generally designates a seat for a vehicle 12. The seat 10 includes a seat bottom 14 and a seatback 16 pivotably coupled to the seat bottom 14. The seat 10 also includes an adjustment assembly 18 for adjusting the inclination of the seatback 16 relative to the seat bottom 14. The adjustment assembly 18 is operably coupled with a lockable recliner mechanism 20. The adjustment assembly 18 includes a motor 22 for selectively unlocking the recliner mechanism 20 and permitting manual adjustment of the inclination of the seatback 16 when the motor 22 is rotated in a first direction. The seat bottom 14 may be configured to be mounted on a support surface, such as a floor 24 of the vehicle 12. A track assembly 26 may be coupled to the seat bottom 14 to facilitate fore and aft positioning of the seat 10. The motor 22 may be rotated in a second opposing direction to release the seat 10 from the track assembly 26 for manual movement in the fore/aft positions. It will be appreciated, however, that the adjustment assembly 18 may be configured to release any first feature (e.g., seatback) when the motor 22 is rotated in a first direction and/or a second feature (e.g., seat bottom 14) when the motor 22 is rotated in a second direction. The adjustment assembly 18 further includes one or more switches 28 electrically coupled to the motor 22 for selectively energizing the motor 22.

Figure 2:
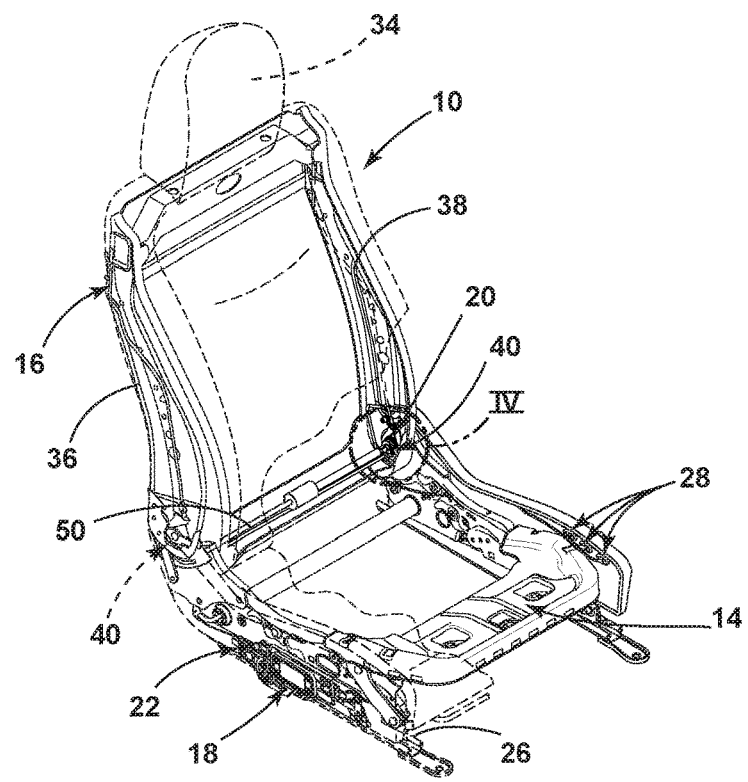
FIG. 2 is a top perspective view of the seat of FIG. 1.

Referring to FIGS. 1 and 2, the seat 10 is generally configured for use in a variety of vehicles 12 in either a front driver seat, a front passenger seat, or a rear seat of the vehicle 12 and generally includes the seatback 16 and the seat bottom 14, each having a cushion 30, 32, respectively.

A headrest 34 is also mounted to the top of the seatback 16. The seat 10 is generally designed for the comfort of a passenger, as well as to accommodate and protect a passenger during a collision event.

Referring still to FIGS. 1 and 2, the seatback 16 includes first and second vehicle seatback support members 36, 38 disposed on opposite lateral sides of the seat 10 and of substantially mirror image construction relative to one another. The first and second vehicle seatback support members 36, 38 form a portion of the frame of the seatback 16 and are generally designed to provide support to the occupant's back and to help protect an occupant during a collision event. Each of the first and second vehicle seatback support members 36, 38 includes a recliner mechanism aperture 40 disposed near the bottom thereof and adapted to receive recliner mechanisms 20, which are commonly referred to in the art as "recliner hearts." The recliner mechanisms 20 are affixed to the first and second vehicle seatback support members 36, 38 via laser welding, or other suitable affixing means. The recliner mechanisms 20 provide an interface between the first and second vehicle seatback support members 36, 38 and the seat bottom 14.

With further reference to FIGS. 1 and 2, according to some examples, the switch 28 is illustrated in the form of an electronic push button, though it should be understood that any suitable input device, such as a toggle switch, rocker switch, or microswitch could also be utilized. The switch 28 is electrically connected to the motor 22 for selectively energizing the motor 22. In some examples, the switch 28 may additionally, and/or alternatively, be configured as a capacitive sensor. The capacitive sensor provides a sense activation field that encompasses an area proximate the switch 28 and can detect capacitive changes resulting from a conductor, such as a finger of an occupant, being within the sense activation field of the capacitive sensor. It should be appreciated, however, that additional or alternative types of proximity sensors can be used for detecting various other signal changes, such as, but not limited to, inductive sensors, optical sensors, temperature sensors, resistive sensors, the like, or a combination thereof The switch 28 is shown mounted to a side shield 42 disposed on the lateral side of the seat bottom 14. The side shield 42 may be a decorative trim component, though it may include a variety of apertures and connecting points for securing various mechanical devices thereto, as well as for securing the side shield 42 to the seat 10. The switch 28 may be mounted sub-flush to a surface of the side shield 42, thereby eliminating, or at least reducing, the possibility of inadvertently actuating the switch 28. Alternatively, the switch 28 could be located in other interior locations, for example, in a vehicle door, an instrument panel 44, a steering wheel 46, a center console 48, and/or any other suitably reachable location. It is contemplated that the switch 28 is an on/off type switch, which an occupant actuates for "ON," and releases "OFF." Further, the switch 28 may be provided in a variety of colors and textures, may include a chrome ring or accents, and/or may be illuminated.

Figure 3:
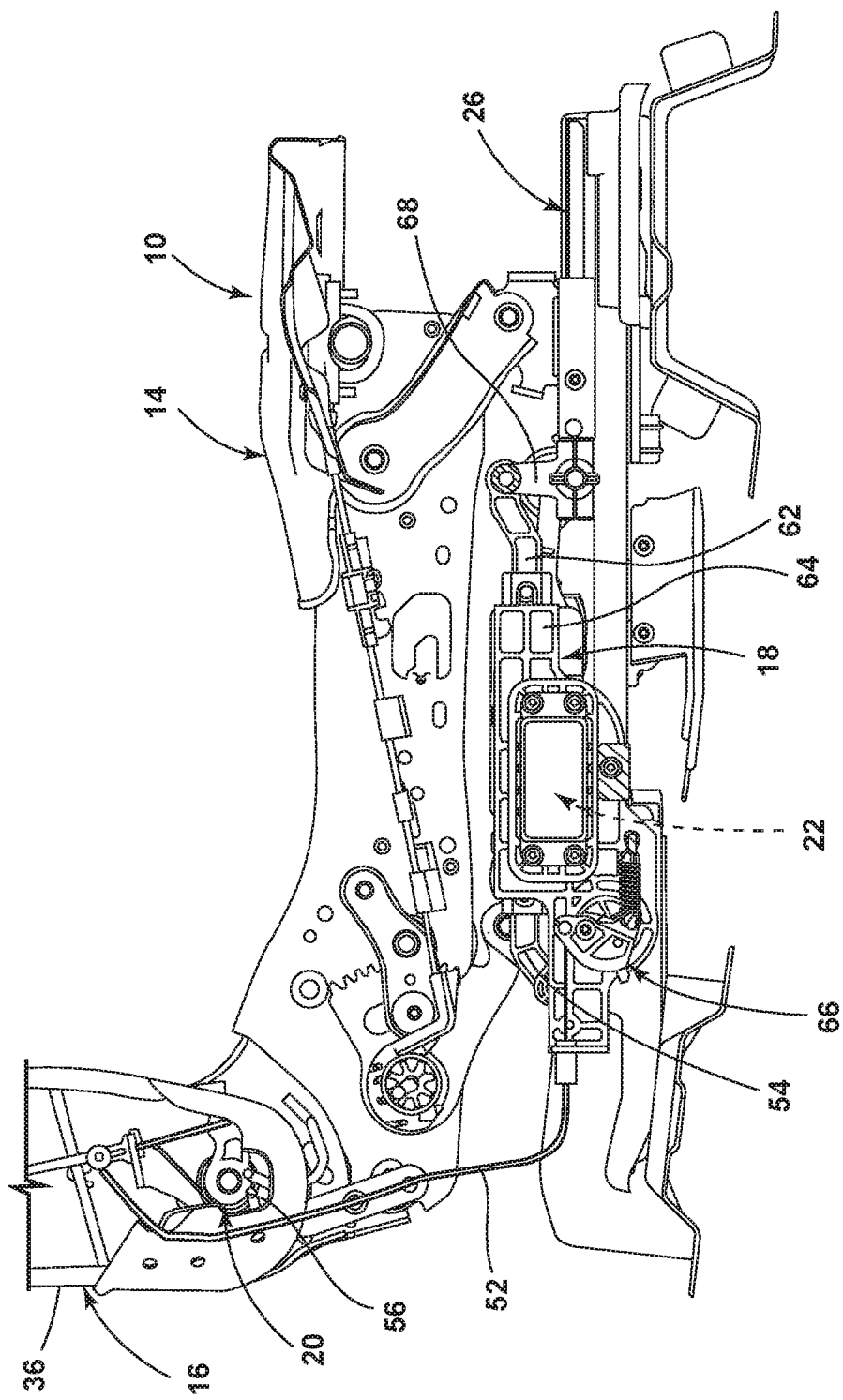
FIG. 3 is a partial side plan view of a seat frame of the seat, according to some examples.
Figure 4:
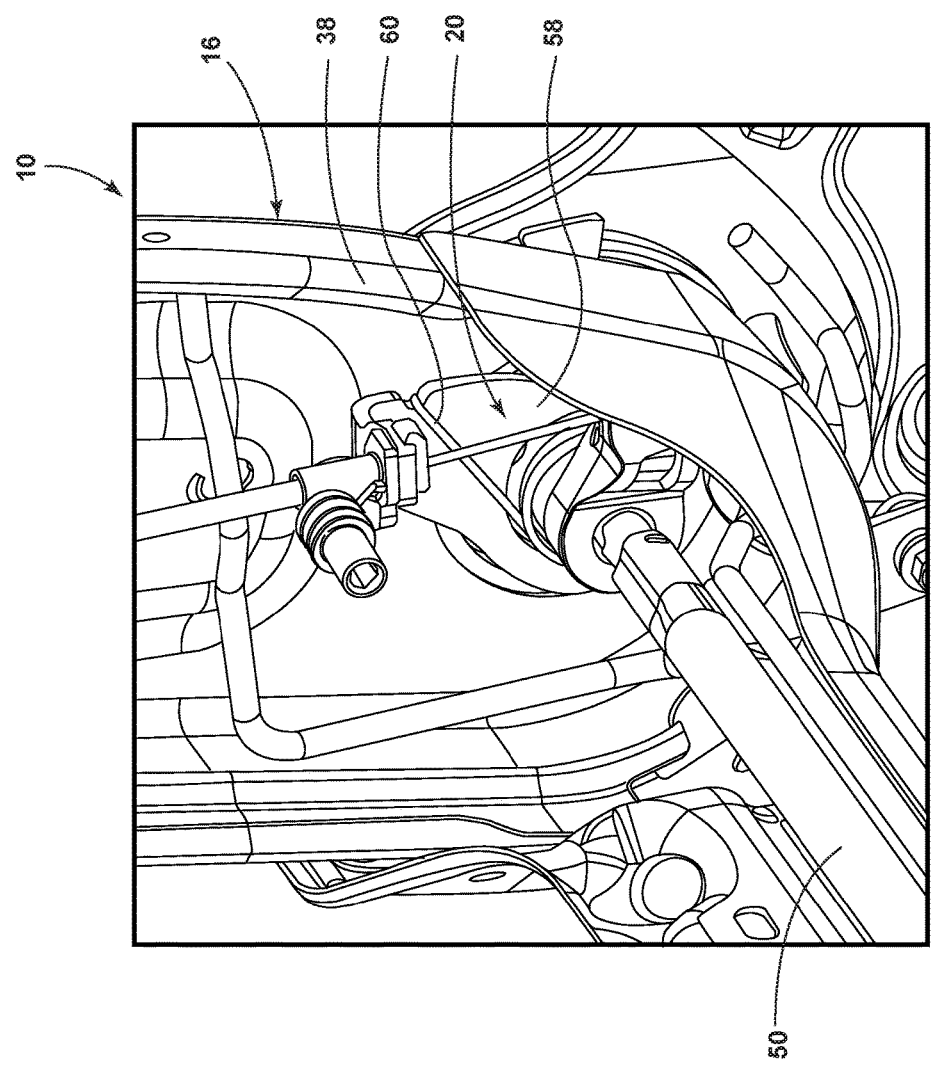
FIG. 4 is an enhanced front perspective view of a recliner mechanism incorporated into the seat, according to some examples.

Referring to FIGS. 2-4, the seatback 16 rotates about a seatback recliner shaft 50 in response to an occupant's actions. The shaft 50 may extend between the seatback support members 36, 38 of the seat 10 and operably connects the recliner mechanisms 20. In some examples, the adjustment assembly 18 is operably coupled with the recliner mechanisms 20 via a wire 52. When a first switch 28 is actuated, the motor 22 may pull a recliner arm 54, which in turn creates a pulling force on the wire 52. By pulling the wire 52, a first portion 56 of the recliner mechanism 20 is rotated relative a second portion 58, which momentarily releases the seatback 16 and is manually rotated. The seatback 16 may be biased in either a forward or a rearward direction by a spring 60. Once the switch 28 is deactuated, the adjustment assembly 18 returns the seatback recliner mechanism 20 to its original or resting, i.e., locked, position thereby locking the seatback 16 in a desired position.

With further reference to FIG. 3, the adjustment assembly 18 may include a track assembly arm 62 extending from opposing side of a housing 64 from the recliner arm 54. The motor 22 is disposed between the recliner arm 54 and the track assembly arm 62. The recliner arm 54 is further coupled with an extension assembly 66 that, when rotated, pulls the wire 52. When the wire 52 is pulled, the first portion 56 of the recliner mechanism 20 is rotated relative the second portion 58 thereby placing the seatback 16 in an unlocked position. Similarly, the track assembly arm 62 is operably coupled with a track release assembly 68 that, when rotated, allows the seat 10 to slide along the track assembly 26 in a fore or aft direction. In some examples, the extension assembly 66 may be activated by the first switch 28 and the rotation assembly may be activated by a second switch 28. When the first switch 28 is activated, the motor 22 may rotate in a first direction. When the second switch 28 is activated, the motor 22 may rotate in a second, opposed direction. Due to the opposed movement of the motor 22, in some instances, the seatback 16 may be placed in a locked position while the seat 10 is free to slide along the track assembly 26. Similarly, the seat 10 may be locked to the track assembly 26 while the seatback 16 is freely rotatable.

With reference to FIG. 4, the spring 60 may be wound about the recliner shaft 50 and biased to return the recliner mechanism 20 to a locked position. Accordingly, upon the deactivation of the switch 28, the spring 60 may assist in returning the first portion 56 of the recliner mechanism 20 to the locked position. In some examples, the recliner shaft 50 may have a plurality of teeth therearound and the end portions thereof. The teeth may be engageable to gears disposed within the first portion 56 of the recliner mechanism 20 for assistance in moving the seatback 16 between various positions.

Figure 5:
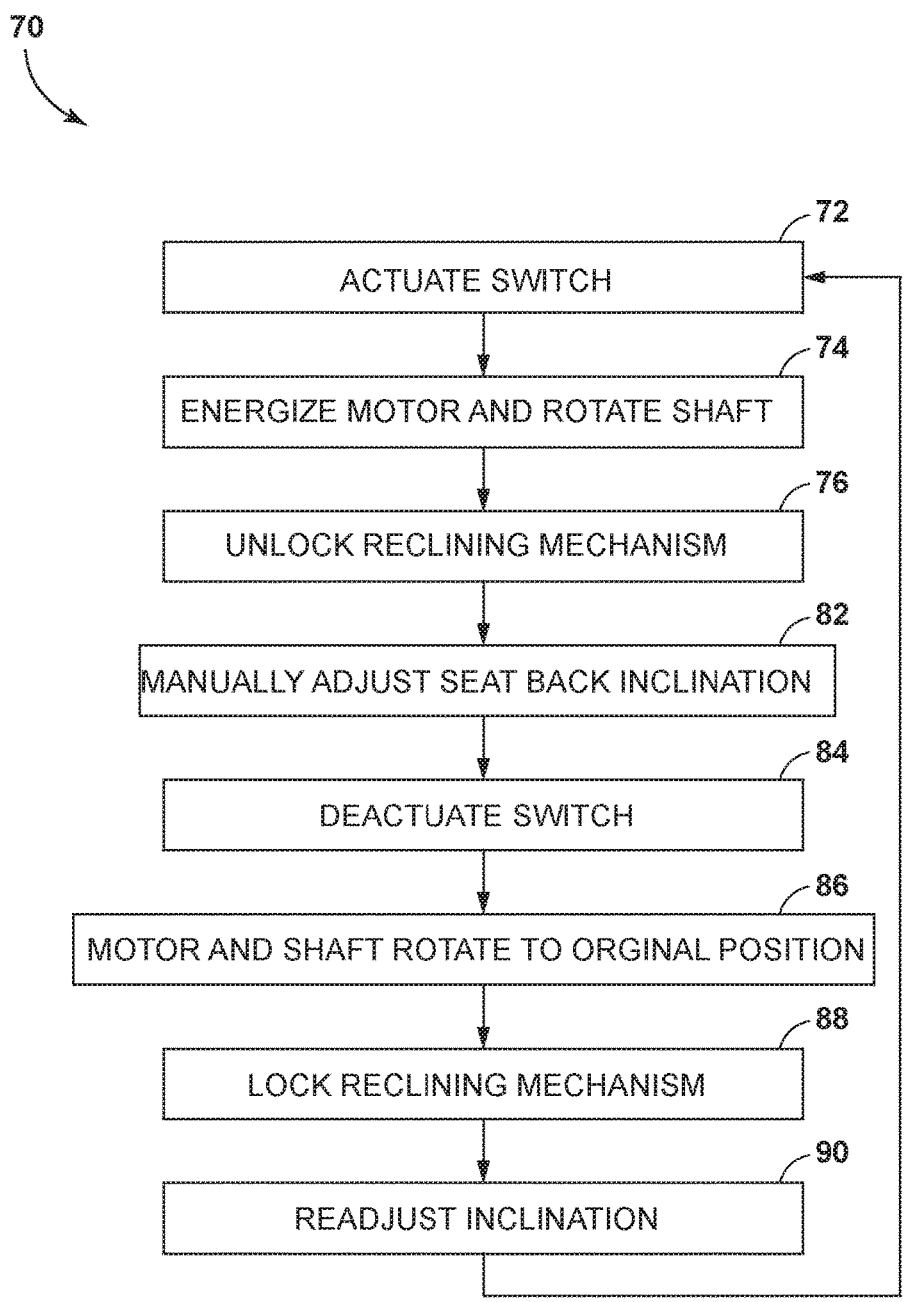
FIG. 5 is a flowchart illustrating a method of adjusting the inclination of the seat back, according to some examples.
Figure 6:
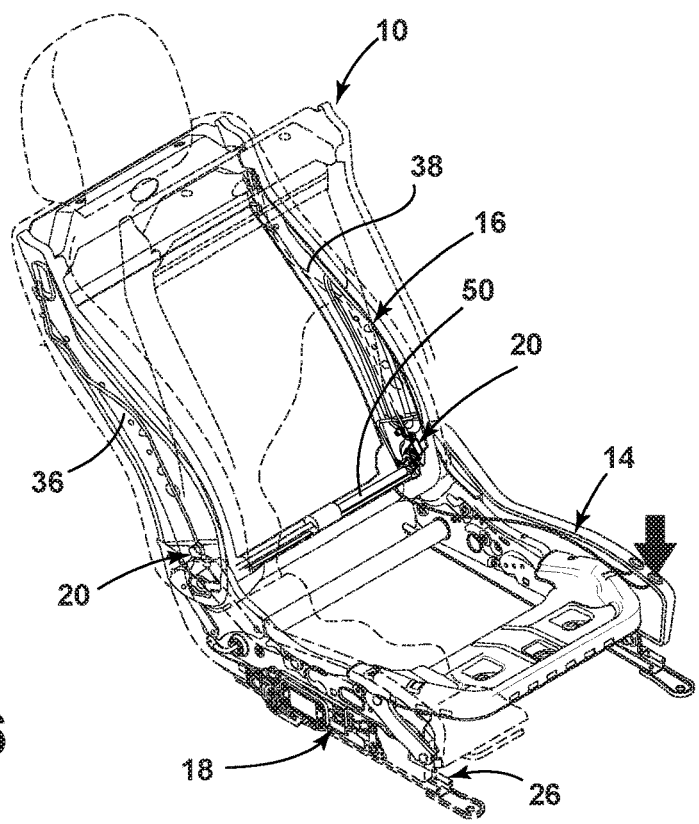
FIG. 6 is a top perspective view of the reclining seat, illustrating adjusting the inclination of a seat back of the reclining seat, according to some examples.
Figure 7:
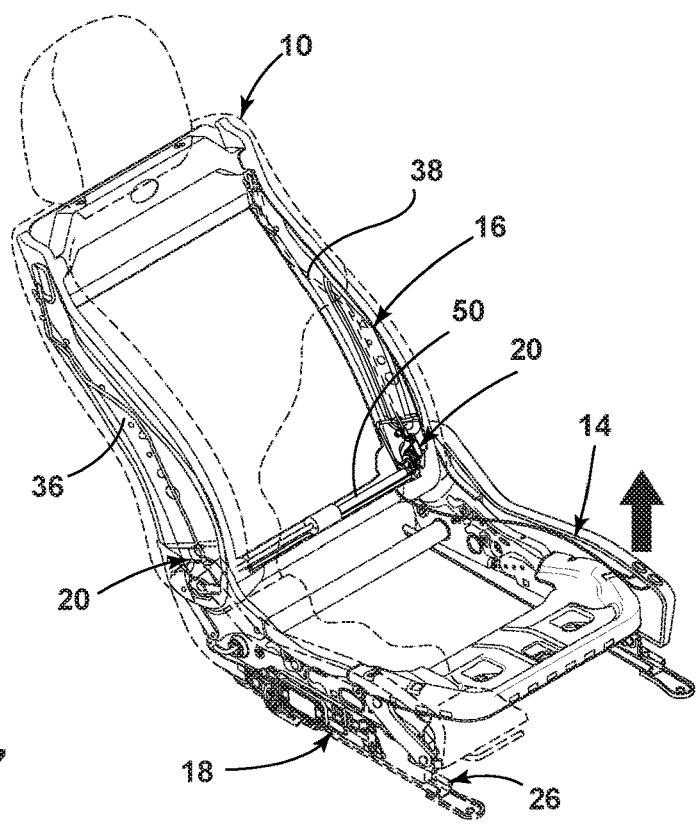
FIG. 7 is a top perspective view of the reclining seat, illustrating the adjusted position, according to some examples.

Referring to FIGS. 5-8, in operation, an occupant may wish to adjust the inclination of the seatback 16 relative to the seat bottom 14. According to an example illustrated in FIG. 5, a method 70 for adjusting the inclination of the seatback 16 begins at step 72. In this initial seatback position illustrated in FIG. 2, the recliner mechanisms 20 are locked and the seatback 16 is not free to move. To adjust the seatback 16, the occupant may depress the switch 28 as in step 72, thereby energizing the motor 22, and rotating the motor 22 in a first direction at step 74 and as shown in FIG. 5. In step 76, rotating the motor 22 moves the recliner arm 54 (FIG. 8), which is operably coupled with the wire 52 on a first end portion 78. The second end portion 80 of the wire 52 is operably coupled to one or both of the recliner mechanisms 20 and moves the first portion 56 of the recliner mechanism 20 from a first position to a second position effectively unlocking the recliner mechanisms 20. The recliner mechanisms 20 remain unlocked while the switch 28 is actuated. At step 82, with the first switch 28 actuated and the recliner mechanisms 20 unlocked, the occupant may manually adjust the seatback 16 to the desired inclination, whether it be more or less reclined. The recliner mechanisms 20, and therefore the seatback 16, are biased toward the upright position, so the occupant may manually push the seatback 16 rearward to recline the seatback 16 further. Once the desired inclination is achieved, the switch 28 may be released, as in step 84 and illustrated in FIG. 6, thereby locking the seatback 16 in the adjusted position. Releasing the switch 28 causes the motor 22 to rotate in an opposite, second direction in step 86. The motor 22 rotates back to a neutral position, relocking the recliner mechanisms 20 and seatback 16 relative to the seat bottom 14, as in step 88. In step 90, if further adjustment is desired, the method 70 may be repeated by cycling back to step 72, actuating the switch 28.

Figure 8:
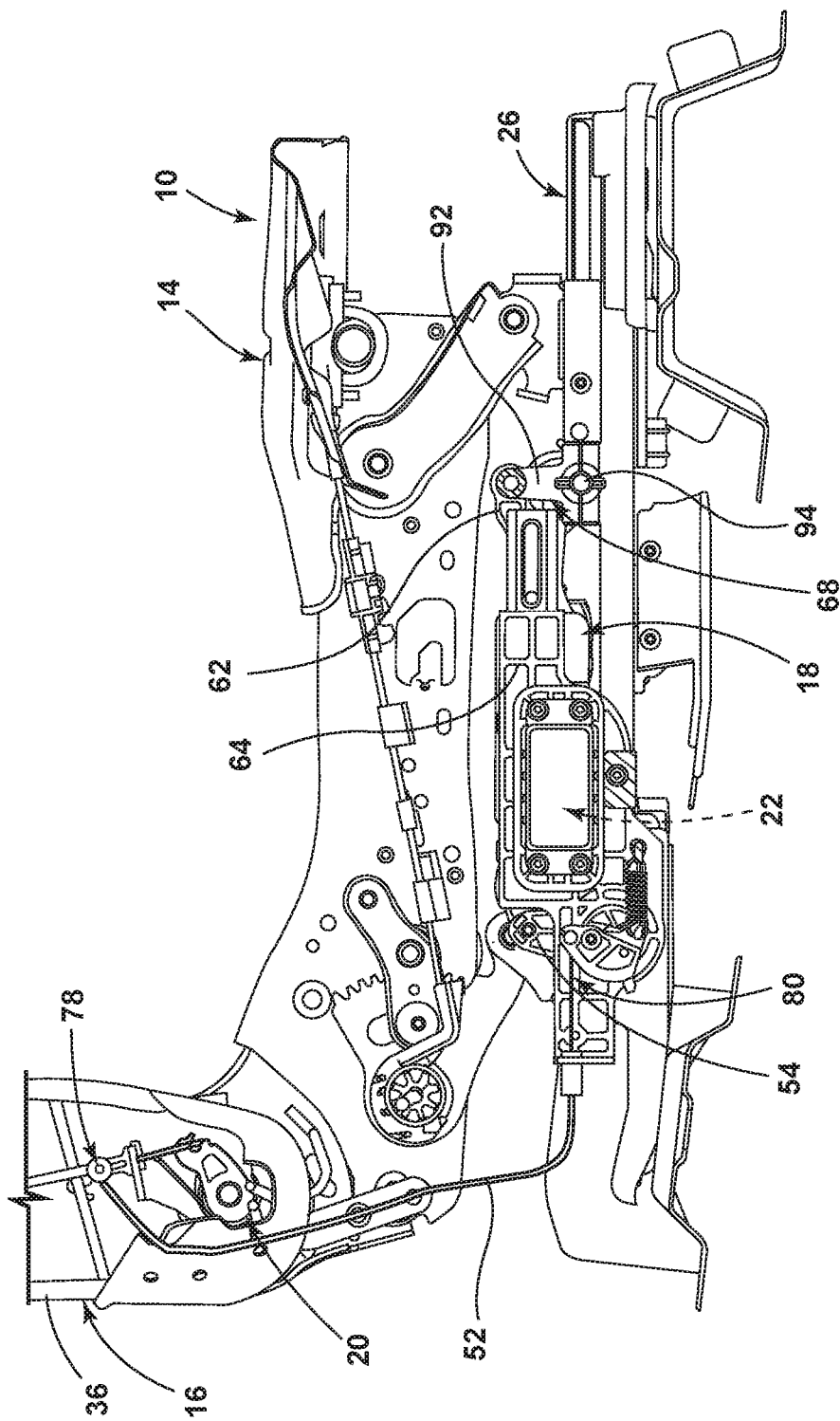
FIG. 8 is a partial side plan view of a seat frame of the seat employing the adjustment assembly with a rack disposed in a first position to actuate the recliner mechanism, according to some examples.
Figure 9:
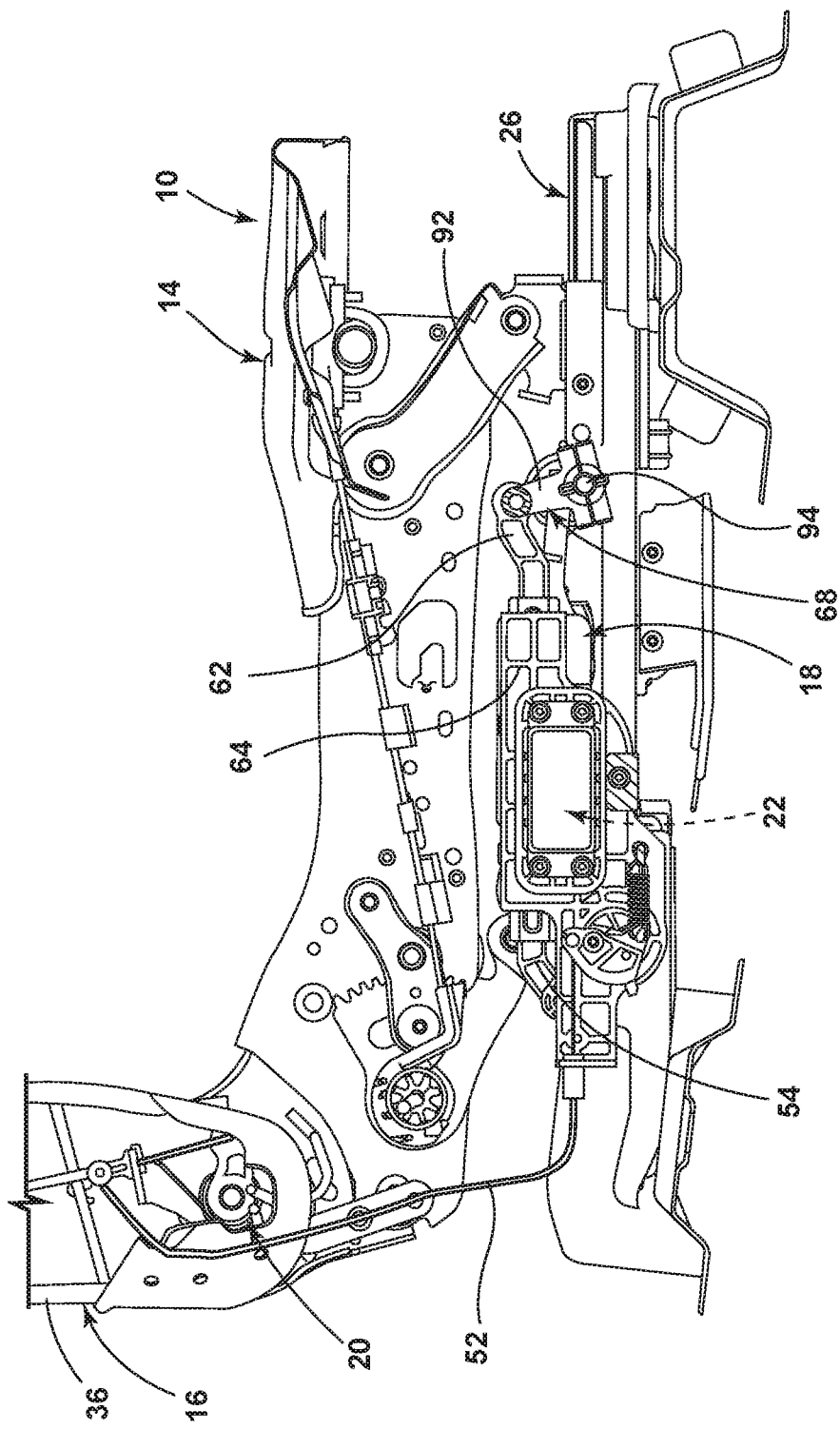
FIG. 9 is a partial side plan view of a seat frame of the seat employing the adjustment assembly with a rack disposed in a second position to actuate a track assembly, according to some examples.
Figure 10:
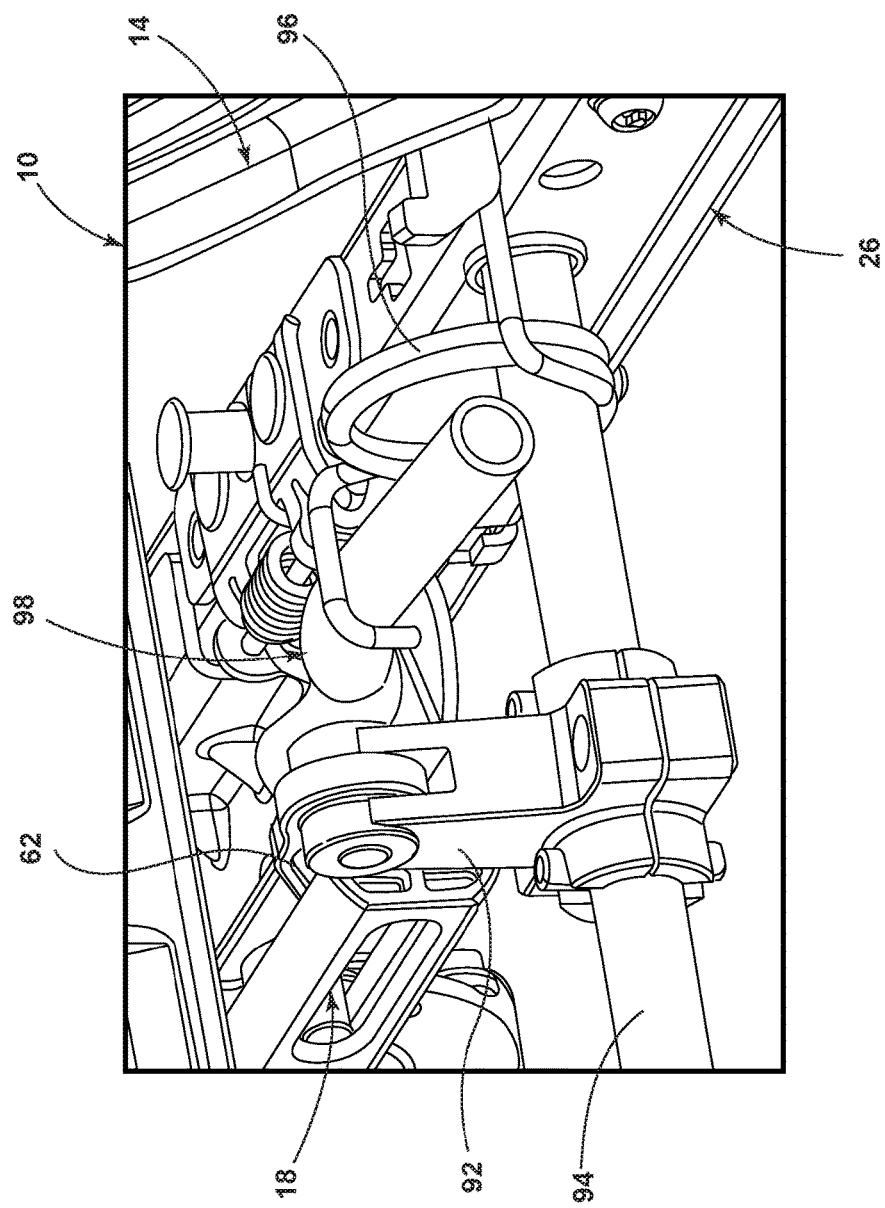
FIG. 10 is a front enhanced perspective view of the adjustment assembly and the track assembly, according to some examples.

Referring to FIGS. 8-10, the track assembly arm 62 includes a connector arm 92 that is coupled to a disengagement rod 94. The disengagement rod 94 may be a rigid member, which is further coupled to a spring member 96. The spring member 96 is coupled to the disengagement rod 94 to bias the disengagement rod 94 in a locked position. In use, when the second switch 28 is actuated, the motor 22 rotates in the second direction. In response, the track assembly arm 62 rotates the connector arm 92. The connector arm 92 is operably coupled with the disengagement rod 94, which pivots with the connector arm 92 in a rearward direction causing a track release lever 98 to move from a locked position to a released position. While in the locked position, the track release lever 98 locks the seat 10 in its current position on the assembly. In the released position, the track release lever 98 allows the seat 10 to move freely along the track assembly 26 in fore and aft directions, i.e., vehicle forward and vehicle rearward.

Figure 11:
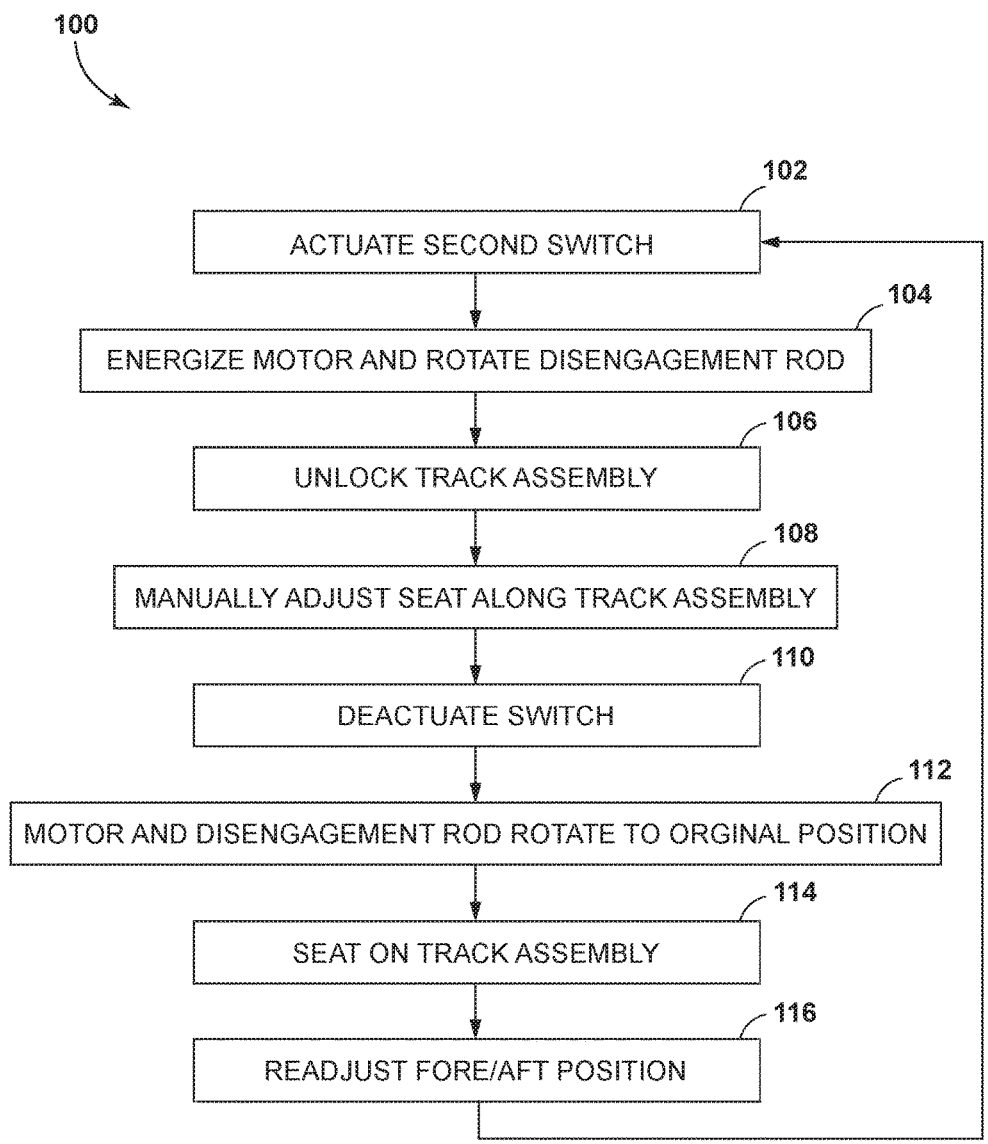
FIG. 11 is a flowchart illustrating a method of adjusting the seat along the track assembly, according to some examples.

Referring to FIG. 11, in operation, an occupant may wish to adjust the fore/aft position of the seat 10 (FIG. 1) relative to the vehicle floor 24 (FIG. 1). According to an example illustrated in FIG. 11, a method 100 for adjusting the fore/aft position of the seat 10 relative to the vehicle floor 24 begins at step 102. In an initial seat position, the seat 10 is locked to the vehicle floor 24 through the track assembly 26 and the seat 10 is not free to move. To adjust the seat 10, the occupant may depress the second switch 28 as in step 102, thereby energizing the motor 22, and rotating the motor 22 in the second direction at step 104. In step 106, rotating the motor 22 moves the track assembly arm 62, which is operably coupled to the connector arm 92. The connector arm 92 moves the disengagement rod 94 from a first position to a second position effectively unlocking the track assembly 26. The disengagement rod 94 remains unlocked while the switch 28 is depressed. At step 108, with the switch 28 depressed and the disengagement rod 94 unlocked, the occupant may manually adjust the seat 10 to the fore/aft position, whether it be more vehicle forward or vehicle rearward of its original position. The seat 10 may be biased toward a fore (or vehicle forward) position, so the occupant may manually push the seat 10 rearward to move the seat 10 further from the steering wheel 46. Once the desired position is achieved, the switch 28 may be deactuated, as in step 110, thereby locking the seat 10 in the adjusted position. Releasing the switch 28 causes the motor 22 to rotate in the first direction in step 112. The motor 22 rotates back to a neutral position, relocking the disengagement rod 94 and seat 10 relative to the vehicle floor 24, as in step 114. In step 116, if further adjustment is desired, the method 100 may be repeated by cycling back to step 102, actuating the switch 28.

Figure 12:
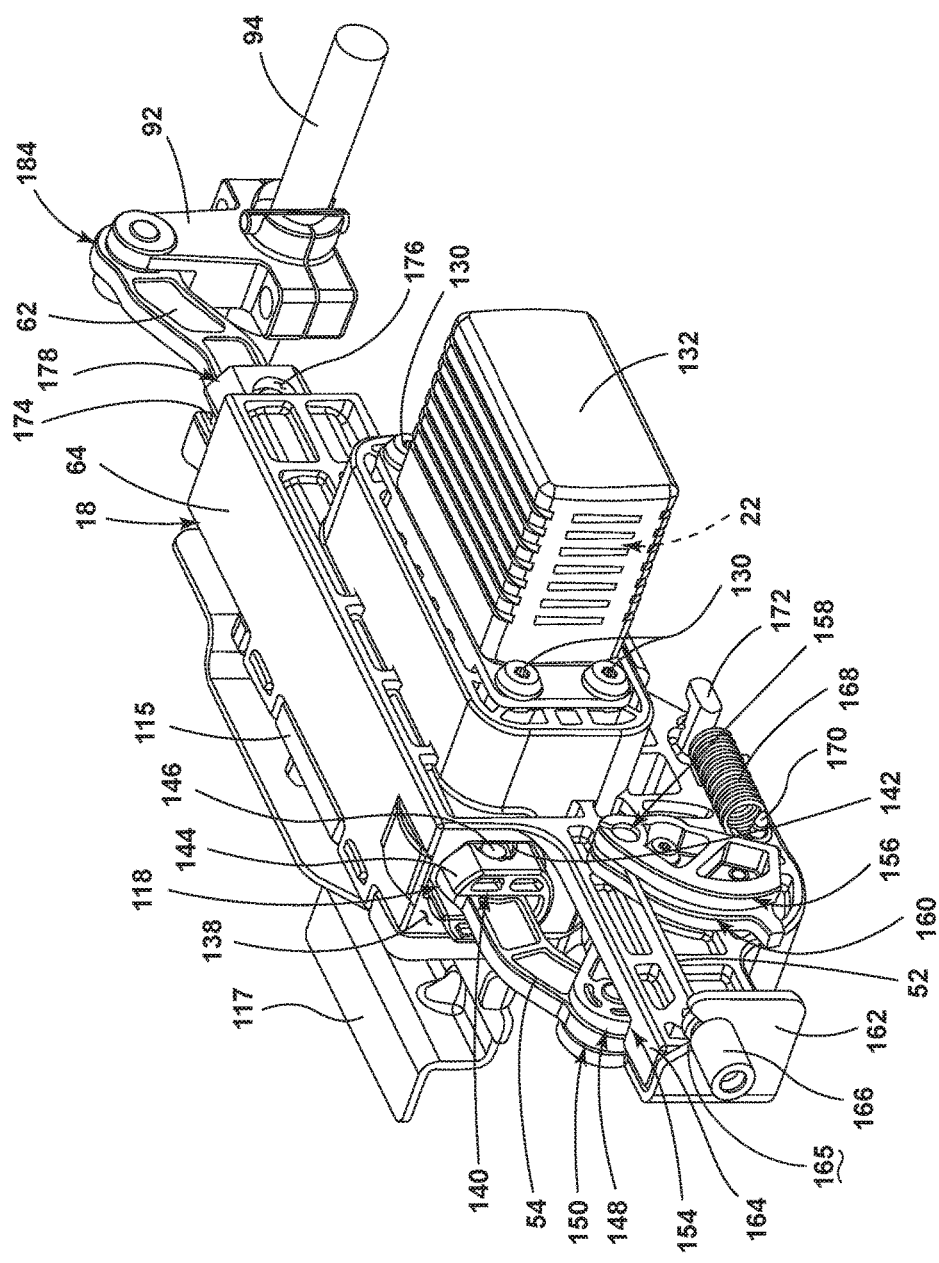
FIG. 12 is a perspective view of the adjustment assembly, according to some examples.
Figure 13:
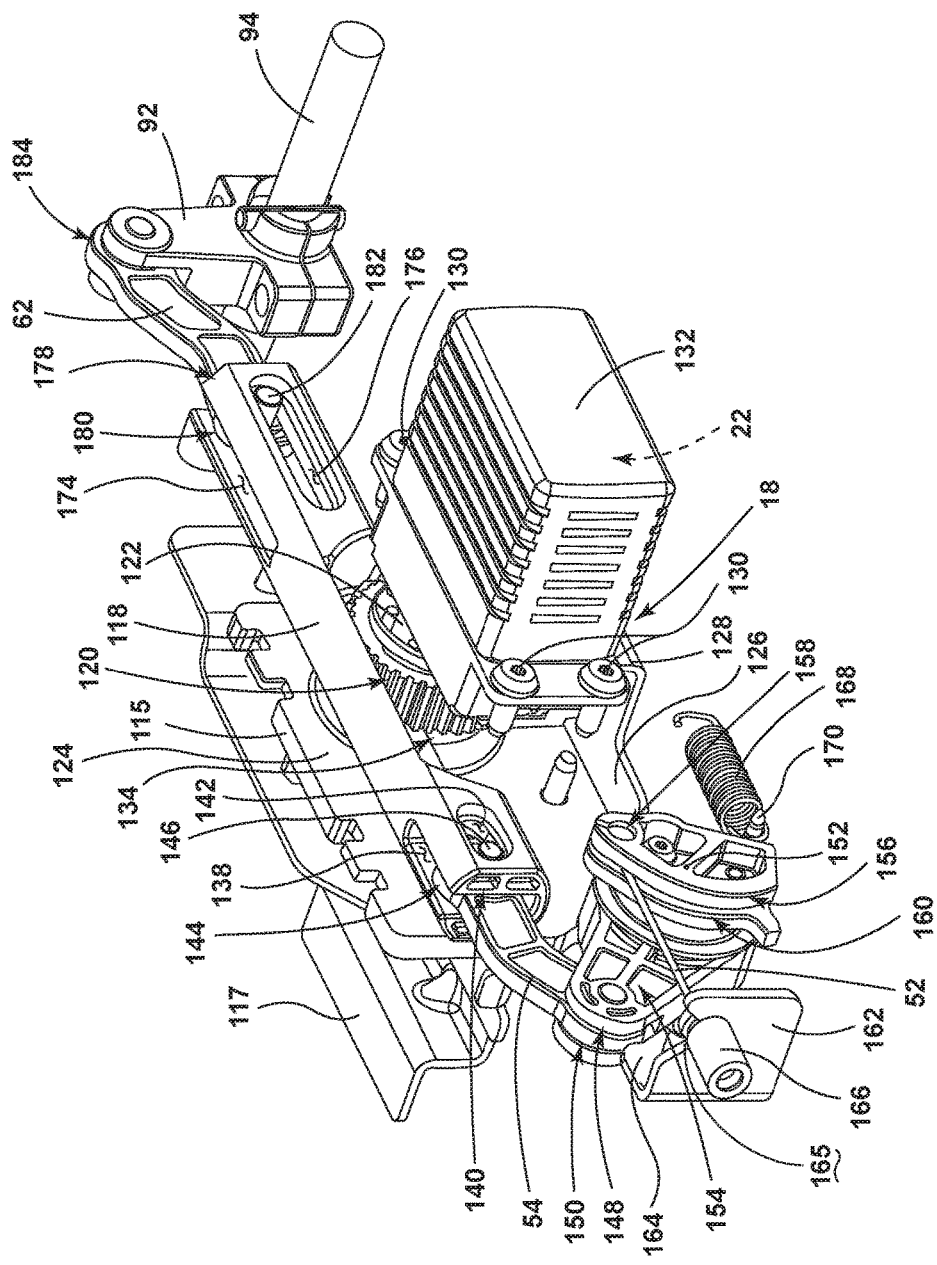
FIG. 13 is a perspective view of the adjustment assembly with a housing removed, according to some examples.

Referring to FIGS. 12 and 13, the housing 64 of the adjustment assembly 18 may be operably coupled with a pinion cover 115. The pinion cover 115, and/or any other portion of the adjustment assembly 18, may be operably coupled with a plate 117, or bracket, that is further coupled to a portion of the seat 10 and/or the vehicle 12 for removably anchoring the adjustment assembly 18 in a fixed location. Accordingly, the adjustment assembly 18 may move with the seat 10 and/or the seat 10 may move independently of the adjustment assembly 18 without departing from the scope of the present disclosure.

A rack 118 and pinion 120 (FIG. 14) may be disposed between the gear cover and the housing 64. A connection shaft 122 extends from the motor 22 and is coupled with the pinion 120. The motor 22 may be a servomotor or a stepper motor, though any suitable type of motor 22 may be utilized without departing from the scope of the present disclosure. The motor 22 is able to control the angular position of the connection shaft 122. As an example, the motor 22 may be an integrated stepper motor capable of a high micro stepping resolution with all the controls and electronics mounted within the motor 22 itself.

The pinion cover 115 may include a first surface 124 that extends parallel to the pinion 120 and a bottom, second surface 126 extending from the first surface 124 and/or transverse to the pinion 120, and a third surface 128 that may be parallel to the first surface 124. The first surface 124 may define one or more apertures through which fasteners may be inserted for coupling the pinion cover 115 to the plate 117. The motor 22 may be operably coupled to the third surface 128 through one or more fasteners 130 and include a motor housing 132 that surrounds at least a portion of the motor 22.

The rack 118 defines a pinion cavity 134. The rack 118 may move in a linear direction as the pinion 120 engages teeth 136 (FIG. 14) on the rack 118. The rotational motion applied to the pinion 120 causes the rack 118 to move relative to the pinion 120, thereby translating the rotational motion of the pinion 120 into linear motion of the rack 118 within the pinion cavity 134.

A first channel 138 is defined by the rack 118 between a first end portion 140 of the rack 118 and the pinion cavity 134. A first guide 142 is also defined by the rack 118 between the first end portion 140 of the rack 118 and the pinion cavity 134. A first end section 144 of the recliner arm 54 is disposed within the channel. A first pin 146 extends transversely from the first section of the recliner arm 54 and into the first guide 142. In some examples, an axis of the first channel 138 is parallel to the direction of movement of the rack 118 along the pinion 120. A pivot assembly 148 is pivotably coupled with a second end section 150 of the recliner arm 54. The pivot assembly 148 is further pivotably coupled to a rotation axis 152, which may be below the recliner arm 54. The pivot assembly 148 may include a first portion 154 and a second portion 156. The second portion 156 may have a coupling portion 158 for removably fixing the wire 52 thereto. A groove 160 may be disposed within the second portion. As the recliner arm 54 moves causing the pivot assembly 148 to rotate, the wire 52 may be disposed within the groove 160.

A support bracket 162 is disposed outwardly of the pivot assembly 148. The support bracket 162 may be operably coupled to the pinion cover 115 and/or be integrally formed therewith. The housing 64 may also include an extension 164 that extends between the first and second portions of the pivot assembly 148 when the housing 64 is coupled to the pinion cover 115. The extension 164 may abut and/or be disposed in close proximity to the support bracket 162. Furthermore, the support bracket 162 may define a channel 165 having a tapered upper section and a rounded bottom section. The rounded bottom section may have a width that is less than a stop 166 on the wire 52. Accordingly, the stop 166 may be substantially inhibited from pulling through the channel 165 and/or inhibit any portion of the wire 52 from pulling through the channel 165.

With further reference to FIGS. 12 and 13, a spring 168 may be operably coupled with the pivot assembly 148. The spring 168 may be configured as an extension spring; however, any type of assembly may be used in conjunction with the spring 168 and/or in lieu of the spring 168 without departing the scope of the present disclosure. The spring 168 may be operably coupled to an attachment feature 170 on the second portion of the pivot assembly 148 on a first side and operably coupled with a housing attachment feature 172 on an opposing, second side. The extension spring may be used to bias the pivot assembly 148 is a desired position, such as a contracted position for the wire 52, which in turn, biases the recliner mechanism 20 to a locked position.

Referring still to FIGS. 12 and 13, the rack 118 may also define a second channel 174 and a second guide 176 that are disposed on a second end portion 178 of the rack 118. A first end portion 180 of the track assembly arm 62 is disposed within the second channel 174. A second pin 182 is coupled to the first end portion 180 of the track assembly arm 62 and is disposed within the second guide 176. A second end portion 184 of the track assembly arm 62 is pivotably coupled to the connector arm 92. The connector arm 92 is further coupled to the disengagement rod 94. In some examples, the connector arm 92 and/or disengagement rod 94 may be biased in a locked position, which may correspond to the connector arm 92 being oriented in a vertical position.

Figure 14:
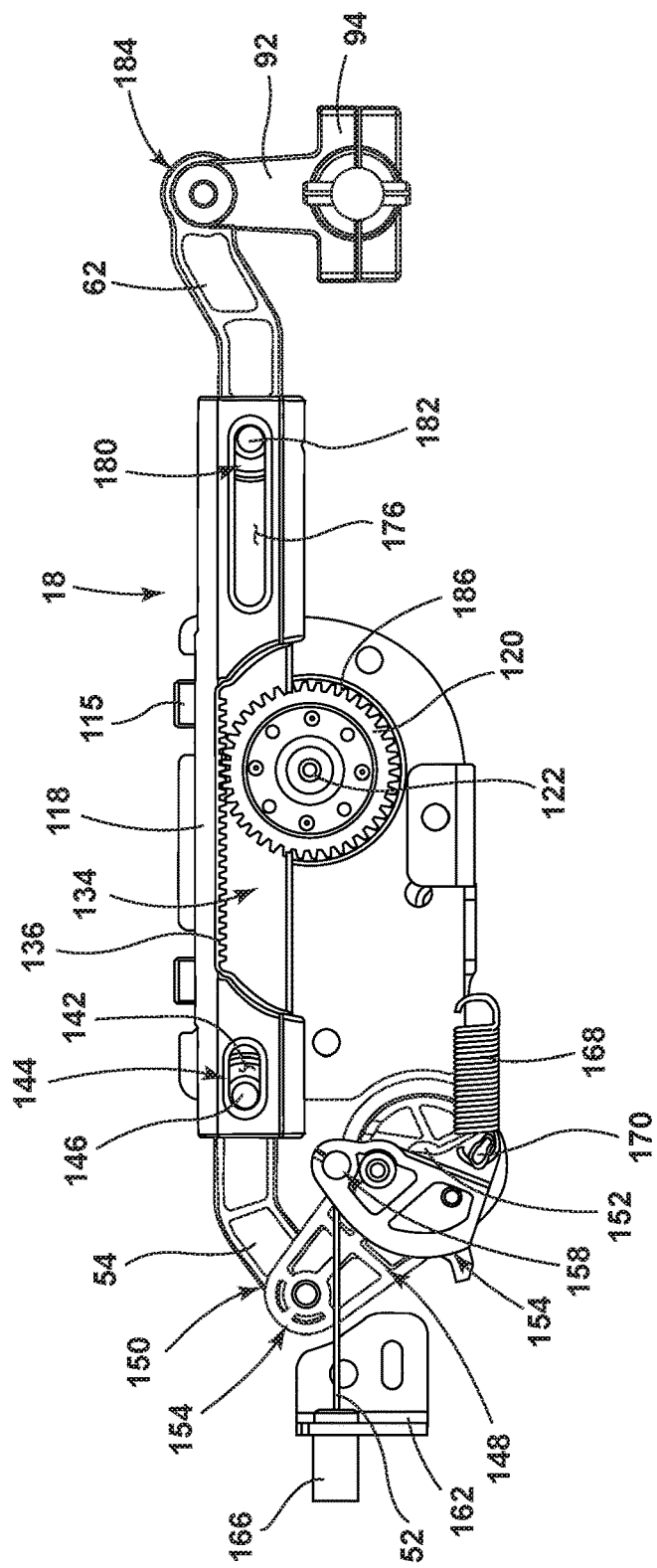
FIG. 14 is a side plan view of the adjustment assembly disposed in a neutral position with the motor assembly removed, according to some examples.
Figure 15:
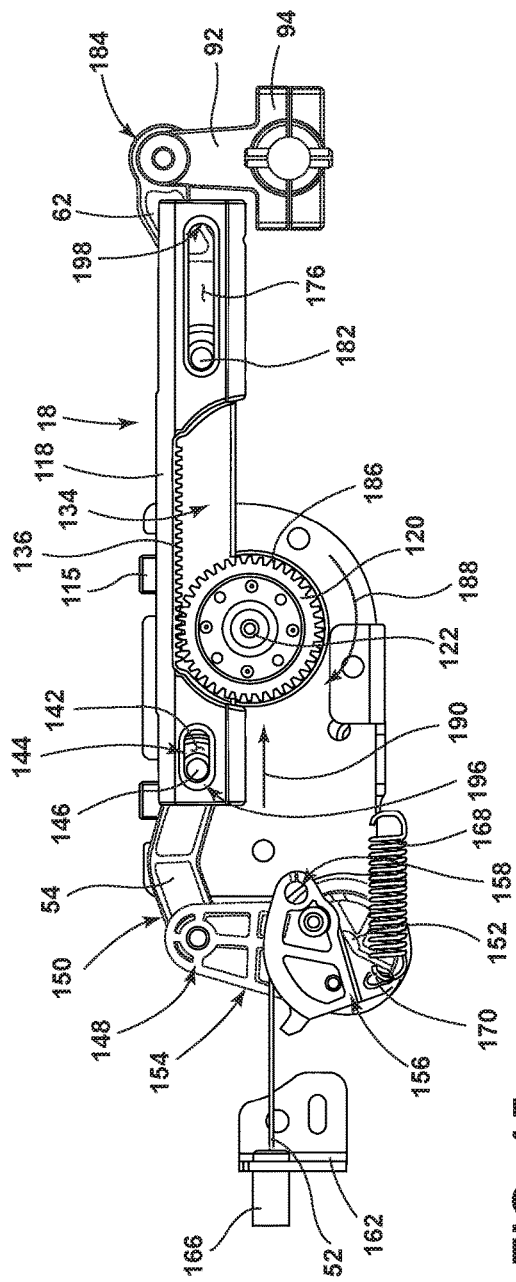
FIG. 15 is a side plan view of the adjustment assembly disposed in a first adjustment position, according to some examples.
Figure 16:
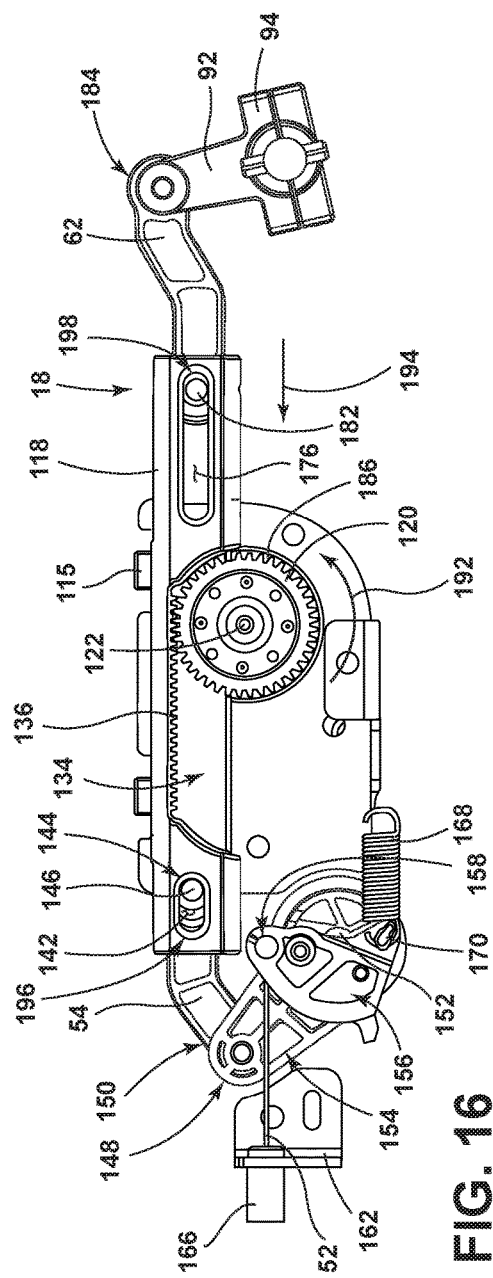
FIG. 16 is a side plan view of the adjustment assembly disposed in a second adjustment position, according to some examples.

Referring to FIGS. 14-16, the adjustment assembly 18, as provided herein, may be a linear actuator that may be configured as a rack 118 and pinion 120. However, any type of linear actuator may be utilized without departing from the scope of the present disclosure. Accordingly, the rack 118 may be driven in two opposing directions by the pinion 120 based on a rotational direction of the pinion 120. As illustrated, the pinion 120 includes a periphery having pinion teeth 186 thereon. The teeth 186 of the pinion 120 are configured to engage/correspond to the teeth 136 of the rack 118. In some examples, as the pinion 120 is rotated, the pinion teeth 186 engage with the teeth 136 of the rack 118 to linearly move the rack 118. It should be noted that the rack 118 might include a toothed or untoothed engaging surface, depending on the particular application. Likewise, the pinion 120 may be either a toothed gear or a friction wheel.

In operation, the adjustment assembly 18 may be disposed in a neutral position, as illustrated FIG. 14. In the neutral position, the recliner mechanism 20 and the track assembly 26 are both disposed in a locked position. In the neutral position, the pinion 120 may be disposed in an intermediate position within the pinion cavity 134. To adjust the seatback position, the pinion 120 is rotated in a first direction, such as a clockwise direction, as indicated by arrow 188. As the pinion 120 is rotated, the rack 118 moves in a first linear direction, as indicated by arrow 190. As the rack 118 moves along arrow 190, the first pin 146 within the first channel 138 contacts an end portion 196 of the first channel 138. The first pin 146, when in contact with the first channel 138, pulls the recliner arm 54 thereby rotating the pivot assembly 148, which may be in a direction opposite to the direction of the pinion 120. As the pivot assembly 148 is rotated, the wire 52 is pulled thereby releasing the recliner mechanism 20 such that the seatback 16 may be adjusted. As provided herein, the seatback 16 may be manually adjusted while the switch 28 is activated and the first pin 146 is pulling the recliner arm 54. Once a desired position is obtained, the switch 28 is deactivated. When the switch 28 is deactivated, the pinion 120 returns to the neutral position, such as the position exemplarily illustrated in FIG. 14, and the seatback 16 is returned to a locked position.

To adjust the seat 10 along the track assembly 26, the pinion 120 rotates in a second direction, such as a counter-clockwise direction, as indicated by arrow 192. As the pinion 120 is rotated, the rack 118 moves in a second linear direction, as indicated by arrow 194. As the rack 118 moves along arrow 194, the second pin 182 within the second channel 174 contacts an end portion 198 of the second channel 174. The second pin 182, when in contact with the second channel 174, pulls the track assembly arm 62 thereby rotating the connector arm 92 and/or the disengagement rod 94, which each may rotate in a direction opposite to the direction of the pinion 120 rotation. As the disengagement rod 94 is rotated, the track assembly 26 is placed in an unlocked position such that the seat 10 may be adjusted along the track assembly 26. As provided herein, the seat 10 may be manually adjusted while the second switch 28 is compressed and the rack 118 is pulling the track assembly arm 62. Once a desired position is obtained, the second switch 28 is deactivated. When the switch 28 is deactivated, the pinion 120 returns to the neutral position, such as the position exemplarily illustrated in FIG. 14, and the seat 10 is returned to a locked position.

In some examples, a third switch 28 may be actuated to control each feature after one another. For example, to assist an occupant in entering the vehicle 12, the occupant may actuate the third switch 28, which in turn, releases the recliner mechanism 20. As provided herein, the recliner mechanism 20 may be biased in a forward direction. Thus, the seatback 16 may be rotated vehicle forward. Upon completion of rotating the seatback 16 vehicle forwardly, the adjustment assembly 18 may release the track assembly 26. As provided herein, the track assembly 26 may be biased in a vehicle forward direction. Accordingly, with the seatback 16 in a forwardly orientated position, the seat 10 may also move vehicle forwardly thereby provided additional room for an occupant to enter the vehicle rearwardly of the seat 10. It will be appreciated that the seatback 16 and/or seat 10 may move in any order and be biased in any direction without departing from the scope of the present disclosure. It will be appreciated that the recliner mechanism 20 may be released prior to the track assembly 26, and/or vice versa. Moreover, the vehicle seat 10 may be programmed to move to a predefined position as an occupant approaches and/or exits the vehicle 12.

A variety of advantages may be derived from the use of the present disclosure. For example, use of the disclosed seat adjustment assembly can provide for various movements of a vehicle seat to accommodate a wide range of passengers. The seat adjustment assembly can save costs, resources, and materials and is generally more efficient than standard, conventional seat assemblies that include movement assemblies that are independent of one another.

According to various examples, a vehicle seat is provided herein. The vehicle seat includes a seatback pivotally coupled to a seat bottom. An adjustment assembly is operably coupled with the seat and includes a linear actuator. The linear actuator is configured to release a recliner mechanism when moved in a first direction and configured to release a track assembly when moved in a second direction. Examples of the vehicle seat can include any one or a combination of the following features:

the linear actuator is configured as a rack and a pinion, the pinion driven by a motor;
the recliner mechanism includes a shaft extending between a pair of recliner hearts;
the adjustment assembly is operably coupled with the recliner mechanism via a wire, the linear actuator configured to pull the recliner arm generating a force on the wire to rotate a first portion of the recliner mechanism relative a second portion of the recliner mechanism to release the seatback;
a first switch electrically coupled to the adjustment assembly for moving the linear actuator in a first direction; and a second switch electrically coupled to the adjustment assembly for moving the linear actuator in a second direction;
a third switch coupled to the adjustment assembly configured to move the linear actuator in a first direction to release the recliner mechanism and then move the linear actuator in a second direction to release the track assembly;
the rack defines a pinion cavity, first and second channels, and first and second guides, the first channel and first guide disposed on an opposing side of the pinion cavity from the second channel and second guide;
a recliner arm is disposed within the first channel and a first pin is operably coupled with the recliner arm, the first pin extending into the first guide;
a track assembly arm is disposed within the second channel and a second pin is operably coupled with a track assembly arm, the second pin extending into the second guide;
the rack is configured to linearly move in a first direction causing the first pin to contact an end portion of the first guide thereby pulling the recliner arm in the first direction;
the rack is configured to linearly move in a second direction causing a second pin to contact an end portion of the second guide thereby pulling the track assembly arm in the second direction; and/or
a pivot assembly including a first portion coupled with a recliner arm second portion having a coupling portion for removably fixing a wire thereto, wherein the wire is operably coupled with the recliner mechanism.

Moreover, a method of manufacturing a vehicle seat is provided herein. The method includes pivotally coupling a seatback to a seat bottom. An adjustment assembly is operably coupled with the seat and includes a linear actuator. The linear actuator is configured to release a recliner mechanism when moved in a first direction and configured to release a track assembly when moved in a second direction.

According to some examples, a vehicle seat is provided herein. The vehicle seat includes a seatback pivotally coupled to a seat bottom. An adjustment assembly is operably coupled with the seat and is configured to pull a recliner arm when moved in a first direction and a track assembly arm when moved in a second direction. A wire is operably coupled with the recliner arm and a recliner mechanism to release the seatback relative the seat bottom. A disengagement rod operably coupled with the track assembly arm. Examples of the vehicle seat can include any one or a combination of the following features:

the seatback is locked relative the seat bottom and the track assembly is locked relative a vehicle floor in a neutral position;
the adjustment assembly includes a rack that defines a pinion cavity, first and second channels, and first and second guides, the first channel and first guide disposed on an opposing side of the pinion cavity from the second channel and second guide; and/or
the rack is configured to linearly move in a first direction causing a first pin to contact an end portion of the first guide thereby pulling the recliner arm in the first direction and to linearly move in a second direction causing a second pin to contact an end portion of the second guide thereby pulling the track assembly arm in the second direction.

According to other examples, a vehicle seat is provided herein. The vehicle seat includes a seatback pivotally coupled to a seat bottom. An adjustment assembly includes a rack and a pinion configured to release a first feature and a second feature when the rack is moved in first and second directions. The rack defines a pinion cavity and first and second guides. The first guide is disposed on an opposing side of the pinion cavity from the second guide. Examples of the vehicle seat can include any one or a combination of the following features:

- a recliner arm is disposed within a first channel and a first pin is operably coupled with a recliner arm, the first pin extending into the first guide;
- a track assembly arm is disposed within a second channel and a second pin is operably coupled with a track assembly arm, the second pin extending into the second guide; and/or
- the rack is configured to linearly move in the first direction causing the first pin to contact an end portion of the first guide thereby pulling the recliner arm in the first direction and in a second direction causing the second pin to contact an end portion of the second guide thereby pulling the track assembly arm in the second direction.

It will be understood by one having ordinary skill in the art that construction of the described invention and other components is not limited to any specific material. Other exemplary examples of the invention disclosed herein may be formed from a wide variety of materials unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle seat comprising:
    a seatback pivotally coupled to a seat bottom; and
    an adjustment assembly operably coupled with the seat and including a linear actuator, the linear actuator configured to release a recliner mechanism when moved in a first direction and configured to release a track assembly when moved in a second direction.

2. The vehicle seat of claim 1, wherein the linear actuator is configured as a rack and a pinion, the pinion driven by a motor.

3. The vehicle seat of claim 1, wherein the recliner mechanism includes a shaft extending between a pair of recliner hearts.

4. The vehicle seat of claim 1, wherein the adjustment assembly is operably coupled with the recliner mechanism via a wire, the linear actuator configured to pull the recliner arm generating a force on the wire to rotate a first portion of the recliner mechanism relative a second portion of the recliner mechanism to release the seatback.

5. The vehicle seat of claim 1, further comprising:
a first switch electrically coupled to the adjustment assembly for moving the linear actuator in a first direction; and
a second switch electrically coupled to the adjustment assembly for moving the linear actuator in a second direction.

6. The vehicle seat of claim 5, further comprising:
a third switch coupled to the adjustment assembly configured to move the linear actuator in a first direction to release the recliner mechanism and then move the linear actuator in a second direction to release the track assembly.

7. The vehicle seat of claim 2, wherein the rack defines a pinion cavity, first and second channels, and first and second guides, the first channel and first guide disposed on an opposing side of the pinion cavity from the second channel and second guide.

8. The vehicle seat of claim 7, wherein a recliner arm is disposed within the first channel and a first pin is operably coupled with the recliner arm, the first pin extending into the first guide.

9. The vehicle seat of claim 8, wherein a track assembly arm is disposed within the second channel and a second pin is operably coupled with a track assembly arm, the second pin extending into the second guide.

10. The vehicle seat of claim 8, wherein the rack is configured to linearly move in a first direction causing the first pin to contact an end portion of the first guide thereby pulling the recliner arm in the first direction.

11. The vehicle seat of claim 10, wherein the rack is configured to linearly move in a second direction causing a second pin to contact an end portion of the second guide thereby pulling the track assembly arm in the second direction.

12. The vehicle seat of claim 1, further comprising:
a pivot assembly including a first portion coupled with a recliner arm second portion having a coupling portion for removably fixing a wire thereto, wherein the wire is operably coupled with the recliner mechanism.

13. A vehicle seat comprising:
a seatback pivotally coupled to a seat bottom;
an adjustment assembly operably coupled with the seat and configured to pull a recliner arm when moved in a first direction and a track assembly arm when moved in a second direction;
a wire operably coupled with the recliner arm and a recliner mechanism to release the seatback relative the seat bottom; and
a disengagement rod operably coupled with the track assembly arm.

14. The vehicle seat of claim 13, wherein the seatback is locked relative the seat bottom and the track assembly is locked relative a vehicle floor in a neutral position.

15. The vehicle seat of claim 13, wherein the adjustment assembly includes a rack that defines a pinion cavity, first and second channels, and first and second guides, the first channel and first guide disposed on an opposing side of the pinion cavity from the second channel and second guide.

16. The vehicle seat of claim 15, wherein the rack is configured to linearly move in a first direction causing a first pin to contact an end portion of the first guide thereby pulling the recliner arm in the first direction and to linearly move in a second direction causing a second pin to contact an end portion of the second guide thereby pulling the track assembly arm in the second direction.

17. A vehicle seat comprising:
a seatback pivotally coupled to a seat bottom; and
an adjustment assembly including a rack and a pinion configured to release a first feature and a second feature when the rack is moved in first and second directions, wherein the rack defines a pinion cavity and first and second guides, the first guide disposed on an opposing side of the pinion cavity from the second guide.

18. The vehicle seat of claim 17, wherein a recliner arm is disposed within a first channel and a first pin is operably coupled with a recliner arm, the first pin extending into the first guide.

19. The vehicle seat of claim 18, wherein a track assembly arm is disposed within a second channel and a second pin is operably coupled with a track assembly arm, the second pin extending into the second guide.

20. The vehicle seat of claim 19, wherein the rack is configured to linearly move in the first direction causing the first pin to contact an end portion of the first guide thereby pulling the recliner arm in the first direction and in a second direction causing the second pin to contact an end portion of the second guide thereby pulling the track assembly arm in the second direction.

* * * * *